Oct. 15, 1935.　　　　L. L. DREW　　　　2,017,235
APPARATUS FOR AGING ALCOHOLIC SPIRITS
Filed March 14, 1934

INVENTOR:
Leslie L. Drew,
BY Redding, Greeley, O'Shea & Campbell
HIS ATTORNEYS

Patented Oct. 15, 1935

2,017,235

UNITED STATES PATENT OFFICE 2,017,235

APPARATUS FOR AGING ALCOHOLIC SPIRITS

Leslie L. Drew, Asbury Park, N. J.

Application March 14, 1934, Serial No. 715,463

2 Claims. (Cl. 202—79)

The present invention relates to apparatus for treating and aging alcoholic spirits and embodies, more specifically, an apparatus by means of which the bouquet, flavor and color of spirits may be substantially improved and more effectively controlled than in processes and apparatus now used. The manufacture of spirits as now practiced has, as one very definite objective, the provision of a well rounded bouquet and flavor in the spirits, these characteristics being secured during the aging of the spirits in wood. Effective control of such characteristics, in the processes and apparatus now utilized, is not attained and it is an object of the present invention to provide an apparatus by means of which the development of a well rounded bouquet, flavor and color in spirits may be effected in a comparatively short period of time.

A further object of the invention is to provide an apparatus of the above character wherein the characteristics of bouquet, flavor and color in spirits may be controlled effectively in order that a desired uniformity in production may result.

Further objects, not specifically enumerated above, will be apparent as the invention is described in greater detail in connection with the accompanying drawing, wherein.

Figure 1:
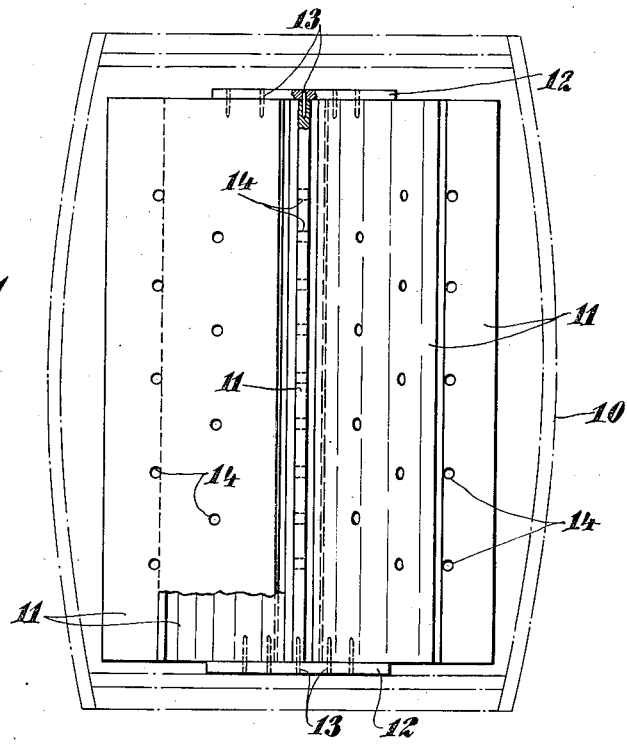
Figure 1 is a view in side elevation showing an apparatus by means of which spirits may be treated in accordance with the present invention.
Figure 2:
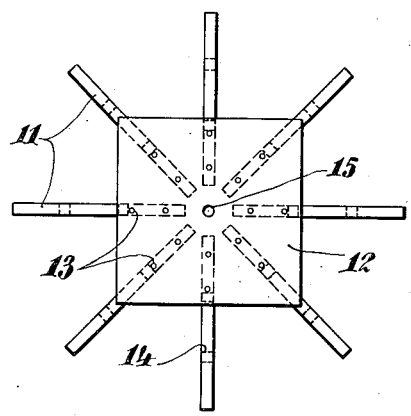
Figure 2 is a plan view of the device of Figure 1.

Referring to the above drawing, the dot and dash lines 10 indicate a suitable container having charred walls within which it has been heretofore customary to age spirits. Within this container, an insert is placed consisting of one or more baffle members 11 which are suitably controlled as by means of top and bottom supporting members 12. The baffle members are preferably secured to the top and bottom members by means of wooden pins 13 and may be formed with apertures 14 to permit a cross flow of fluid between opposite sides of the respective members. Central holes 15 may be provided in the top and bottom members 12 to facilitate cross flow of liquid between the sides of such members. The baffle members 11 are charred upon opposite sides thereof and are preferably formed of white oak.

In practice, the insert is placed in the container 10 with the outer edges of the baffle members spaced from the inner walls of the container in order that a liquid flow around the outer edges of such members may take place. Inasmuch as a very substantial area of charred surface is in contact with the contained spirits, the wood available for extraction is proportionately great. The insert member provides effective baffle surfaces for currents which are set up within the container due to temperature changes or movement of the barrel. Moreover, the perforations and positioning of the baffle members within the container facilitate the contact of the spirits with the surfaces in flowing between opposite sides of the baffle members.

By affording a substantial extent of charred surface in a structure wherein such surface constitutes a baffle to current flow of the liquid within the container the charred wood for adsorption of undesirable elements in the spirits is considerable and also the available quercitrin, quercitannin, and other complex organic materials extractable from the wood is substantially increased. These factors are vitally necessary to the development of a well rounded bouquet, flavor, and color in the spirits and by varying the proportions of charred and uncharred surfaces, the amounts of char may be proportioned to the extractable compounds aforementioned as desired.

In this connection, it is proposed to provide baffle members 11 of charred surfaces and to secure the desired flavor, other members having uncharred surfaces may be incorporated in the insert. Moreover, if desired, desired portions of the baffle members may be charred and other portions thereof uncharred to secure the same result. The highly complex compounds obtained from the wood are rendered more available to the new spirits and, as noted above, may be proportioned effectively by regulating the depth of char, the amount of uncharred surfaces, and the amount of plain wood to suit the needs or desires as to bouquet, flavor and color.

From the foregoing, it will be seen that the method of treating spirits in accordance with the present invention comprises the subjecting of the new spirits to baffle members in a container and causing the spirits to be directed against such members by reason of currents set up in the container due to changes in temperature and movement of the container. Such contact of the new spirits with the charred and uncharred surfaces of the baffle member causes the abstraction of the desirable qualities so necessary to bouquet, flavor and color in the product.

While the invention has been described with specific reference to the construction shown in the accompanying drawing, obvious changes in arrangement and design of the baffle members may be made without departing from the invention as defined in the appended claims.

I claim as my invention:

1. In a container for aging alcoholic spirits, an insert therefor having baffle members formed with a plurality of angularly disposed charred surfaces extending substantially from one end of the container to the other, and supporting means secured to the baffle members and supporting the same in fixed angular position within the container, the last named means supporting the baffle members to cause the same to extend from adjacent the central portion of the container toward the side walls thereof and in proximity thereto, the baffle members being formed to be spaced from each other and certain portions of the edges thereof being spaced from the container whereby the baffle members will form a partial obstruction to the natural motion of the spirits in the container when the container is in storage.

2. In a container for aging alcoholic spirits having charred walls, an insert having baffle members formed with a plurality of angularly disposed charred surfaces extending substantially from one end of the container to the other, supporting means secured to the baffle members and supporting the same in fixed angular position within the container, the last named means supporting the first members to cause the same to extend from adjacent the central portion of the container toward the side walls thereof and in proximity thereto, the baffle members being formed to be spaced from each other and certain portions of the edges thereof being spaced from the container whereby the spirits remote from the container walls will be adjacent portions of the baffles and the spirits most remote from the baffles will be adjacent the walls of the container.

LESLIE L. DREW.